United States Patent
Kuroki et al.

(10) Patent No.: US 10,391,686 B2
(45) Date of Patent: *Aug. 27, 2019

(54) MOLD, METHOD FOR MANUFACTURING MOLDED FOAM BODY, AND MOLDED FOAM BODY

(71) Applicant: BRIDGESTONE CORPORATION, Chuo-ku, Tokyo (JP)

(72) Inventors: Hiroyuki Kuroki, Yokohama (JP); Teruo Iwai, Yokohama (JP); Taisuke Yonezawa, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 886 days.

This patent is subject to a terminal disclaimer.

(21) Appl. No.: 14/378,050

(22) PCT Filed: Feb. 6, 2013

(86) PCT No.: PCT/JP2013/052676
§ 371 (c)(1),
(2) Date: Aug. 11, 2014

(87) PCT Pub. No.: WO2013/121942
PCT Pub. Date: Aug. 22, 2013

(65) Prior Publication Data
US 2015/0021804 A1    Jan. 22, 2015

(30) Foreign Application Priority Data
Feb. 13, 2012    (JP) ................................. 2012-028461

(51) Int. Cl.
*B29C 44/12* (2006.01)
*B29D 99/00* (2010.01)
(Continued)

(52) U.S. Cl.
CPC ...... *B29C 44/1209* (2013.01); *B29C 33/0038* (2013.01); *B29C 33/12* (2013.01);
(Continued)

(58) Field of Classification Search
CPC ............ B29C 44/1209; B29C 33/0038; B29C 44/143; B29C 33/12; B29D 99/0092;
(Continued)

(56) References Cited

U.S. PATENT DOCUMENTS 5,273,702 A * 12/1993 Nelson .................... A42B 3/125
264/152
10,099,409 B2 * 10/2018 Kuroki .................. B29C 44/143
2011/0062613 A1 * 3/2011 Haraguchi ............ B29C 44/351
264/41

FOREIGN PATENT DOCUMENTS

JP    63-028613 A    2/1988
JP    04-242688 A    8/1992
(Continued)

OTHER PUBLICATIONS

International Search Report for PCT/JP2013/052676 dated May 14, 2013 [PCT/ISA/210].

*Primary Examiner* — Robert J Grun
(74) *Attorney, Agent, or Firm* — Sughrue Mion, PLLC (57) ABSTRACT

A mold that: makes it possible to manufacture a molded foam body wherein a reinforcing member extends to a portion of the outer face of the molded body main body that corresponds to a parting line in the inner face of the cavity of the mold; and prevents molding problems stemming from the reinforcing member getting into the aforementioned parting line. Also: a method for manufacturing a molded foam body using the aforementioned mold; and a molded foam body manufactured thereby. The aforementioned mold (1) is provided with a seal member (7) that seals the space between mating faces (2a, 3a) of mold parts (2, 3) when the (Continued)

mold is fastened, and said seal member (7) is designed so as to be able to seal the space between the mating faces (2a, 3a) even if the reinforcing member (22) gets in between the mating faces (2a, 3a) on the cavity (4) side of the seal member (7).

12 Claims, 9 Drawing Sheets

(51) Int. Cl.
    *B29C 33/12*     (2006.01)
    *B29C 33/00*     (2006.01)
    *B29C 44/14*     (2006.01)
    B29L 31/00     (2006.01)
    B29K 105/04     (2006.01)
    B29K 105/08     (2006.01)

(52) U.S. Cl.
    CPC ........ *B29C 44/143* (2013.01); *B29D 99/0092* (2013.01); B29K 2105/04 (2013.01); B29K 2105/08 (2013.01); B29L 2031/751 (2013.01); B29L 2031/771 (2013.01)

(58) Field of Classification Search
    CPC ......... B29L 2031/751; B29L 2031/771; B29K 2105/04; B29K 2105/08
    See application file for complete search history.

(56) References Cited

FOREIGN PATENT DOCUMENTS

| | | |
|---|---|---|
| JP | 2009-285943 A | 12/2009 |
| JP | 2010-029276 A | 2/2010 |
| JP | 2011-110798 A | 6/2011 |
| JP | 2011-218573 A | 11/2011 |
| WO | 2009/145102 A1 | 12/2009 |

* cited by examiner

MOLD, METHOD FOR MANUFACTURING MOLDED FOAM BODY, AND MOLDED FOAM BODY

CROSS REFERENCE TO RELATED APPLICATIONS

This application is a National Stage of International Application No. PCT/JP2013/052676 filed Feb. 6, 2013, claiming priority based on Japanese Patent Application No. 2012-028461 filed Feb. 13, 2012, the contents of all of which are incorporated herein by reference in their entirety.

TECHNICAL FIELD

The present invention relates to a mold for manufacturing a molded foam body in which a reinforcement member is disposed across at least a portion of an outer face of a molded body main body formed from a foamable synthetic resin, and the reinforcement member is integrated with the molded body main body, and relates in particular to a mold in which the molded body main body is molded, and the reinforcement member and the molded body main body are integrated together by foaming the foamable synthetic resin raw material inside a cavity, in a state in which the reinforcement member is disposed across an inner face of the cavity. The present invention also relates to a manufacturing method for a molded foam body using the mold, and a molded foam body manufactured by the manufacturing method.

BACKGROUND ART

Seats, such as vehicle seats or household sofas, are configured using a seat pad formed from a foamable synthetic resin, such as a flexible polyurethane foam or a semi-rigid polyurethane foam.

Figure 10:
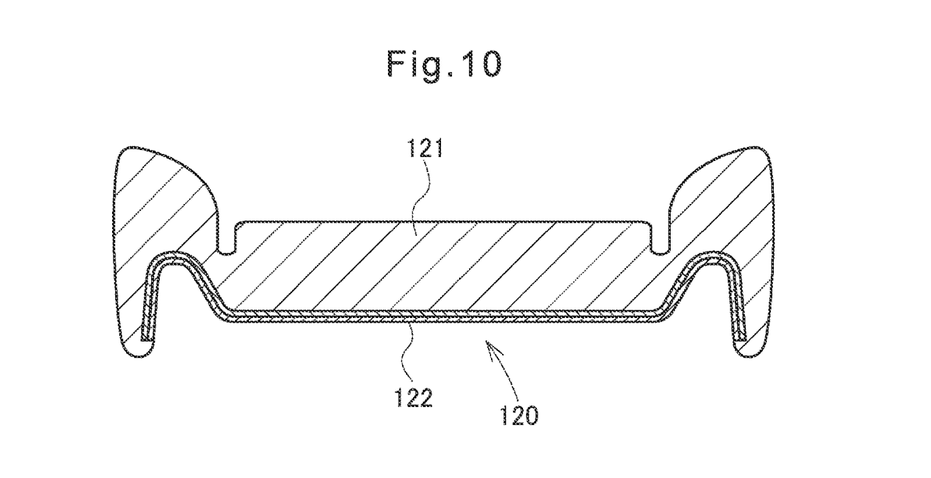
FIG. 10 is a cross-section view of a seat pad according to a conventional example.
Figure 11:
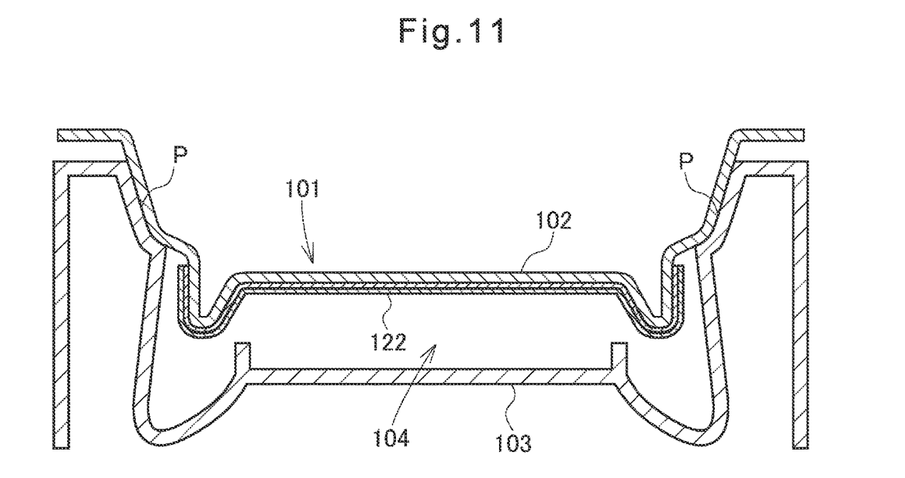
FIG. 11 is a cross-section view of a seat pad manufacturing mold according to a conventional example.

A reinforcement member is sometimes provided to an outer face of the seat pad in order to reinforce the seat pad (Patent Document 1). FIG. 10 is a cross-section view illustrating a conventional example of a seat pad with a reinforcement member, and FIG. 11 is a cross-section view illustrating a conventional example of a mold for manufacturing the seat pad with a reinforcement member. Note that FIGS. 10, 11 respectively illustrate substantially the same content as FIGS. 1, 2 of Patent Document 1.

A seat pad 120 as illustrated in FIG. 10 includes a seat pad main body 121 formed from a foamable synthetic resin such as a polyurethane foam, and a reinforcement member 122 disposed across an opposite side face to a seating face of the seat pad main body 121 (hereafter referred to as the back face), and integrated with the seat pad main body 121. The reinforcement member 122 is formed from a non-woven fabric or the like.

A mold 101 as illustrated in FIG. 11 includes an upper mold 102 and a lower mold 103. The upper mold 102 and the lower mold 103 mate at respective peripheral edge portions. The symbol P in FIG. 11 indicates a parting line formed by joining together the respective mating faces of the peripheral edge portions of the upper mold 102 and the lower mold 103. The seat pad 120 (the seat pad main body 121) is molded with the seating face in a downward facing state inside a cavity 104 that is surrounded by the upper mold 102 and the lower mold 103. Namely, the back face of the seat pad 120 is molded by the cavity inner face of the upper mold 102, and the seating face and side peripheral faces of the seat pad 120 are molded by the cavity inner face of the lower mold 103.

When foam molding the seat pad 120, the reinforcement member 122 is disposed across the cavity inner face of the upper mold 102, and the reinforcement member 122 is fixed to the upper mold 102 by a fixing (not illustrated in the drawings) such as a pin or a magnet. Next, foamable synthetic resin raw material is supplied into the lower mold 103, the mold is closed, and the raw material is foamed. The seat pad main body 121 is molded, and the seat pad main body 121 and the reinforcement member 122 are integrated together, by foamed synthetic resin formed by foaming raw material filling the inside of the cavity 104. The seat pad 120, with the reinforcement member 122 integrally provided to the back face, is obtained by opening and removing from the mold, after the foamed synthetic resin has cured.

Patent Document 2 describes providing a seal member, such as packing, between the mating faces of each molding mold.

BACKGROUND ART

Patent Document 1: Japanese Patent Application Laid-Open (JP-A) No. 2010-29276 Patent Document 2: JP-A No. 2009-285943

SUMMARY OF INVENTION

Technical Problem

It is desirable that the reinforcement member 122 is disposed up to a terminal end of the outer peripheral side of the back face of the seat pad main body 121, in order to evenly and sufficiently reinforce the seat pad 120 up to the terminal end side of the seating face thereof, and to make the outer edge portion of the reinforcement member 122 less liable to come away from the seat pad main body 121 due to deflection of the seat pad 120 when sat on, or the like.

However, the parting line P is present on the inner face of the cavity 104 of the mold 101, at a position corresponding to the terminal end of the outer peripheral side of the seat pad main body 121 back face. As a result, in cases in which the reinforcement member 122 is disposed up to the terminal end of the outer peripheral side of the seat pad main body 121 back face, a high level of attachment precision is required when attaching the reinforcement member 122 to the cavity inner face of the upper mold 102, making manufacturing operations of the seat pad 120 burdensome. Namely, in such cases, the outer peripheral edge of the reinforcement member 122 needs to be aligned with the parting line P when attaching the reinforcement member 122 to the cavity inner face of the upper mold 102. Suppose the attachment position of the reinforcement member 122 is misaligned, then there is a possibility of the reinforcement member 122 becoming trapped between the mating faces of the upper mold 102 and the lower mold 103 during mold fastening. In such cases, sealing at the parting line P after mold fastening becomes insufficient, with a possibility of molding defects occurring.

Sometimes, as in Patent Document 2, a seal member, such as packing, is also provided between the respective mating faces of each molding mold. However, such a seal member is not conventionally configured to be capable of sealing between the mating faces even in a state in which the reinforcement member becomes trapped between the mating faces during mold fastening.

As a result, as illustrated in FIGS. 10, 11, the reinforcement member 122 is conventionally designed to be somewhat smaller than the back face of the seat pad main body 121, and the reinforcement member 122 is disposed such that the outer peripheral edge of the reinforcement member 122 is somewhat distanced from the parting line P, toward the center side of the cavity inner face, when attaching the reinforcement member 122 to the cavity inner face of the upper mold 102. The attachment precision required when attaching the reinforcement member 122 to the cavity inner face of the upper mold 102 is accordingly reduced, enabling the manufacturing operation of the seat pad 120 to be made relatively simple, and also enabling relatively simple prevention of the reinforcement member 122 from becoming trapped between the respective mating faces of the upper mold 102 and the lower mold 103 during mold fastening. However, it is not possible to dispose the reinforcement member 122 up to the terminal end of the outer peripheral side of the seat pad main body 121 back face using this method.

Note that there is also a possibility of molding defects caused by the reinforcement member 122 becoming trapped in the parting line P occurring in cases in which the reinforcement member 122 is disposed so as to straddle positions corresponding to the parting line P on the outer face of the molded body main body 121.

An object of the present invention is to provide a mold that enables manufacture of a molded foam body in which a reinforcement member is disposed up to a position on an outer face of a molded body main body corresponding to a parting line of a cavity inner face of the mold, and that enables prevention of molding defects caused by the reinforcement member becoming trapped in the parting line. A further object of the invention is to provide a manufacturing method of a molded foam body using the mold, and a molded foam body manufactured by the manufacturing method.

Solution to Problem

A mold of a first aspect is a mold for manufacturing a molded foam body including a molded body main body comprising a foamable synthetic resin, and a reinforcement member disposed across at least a portion of an outer face of the molded body main body and integrated with the molded body main body, wherein: the mold includes at least two molding molds, a cavity surrounded by the molding molds is formed by fastening the molding molds together, and a parting line is formed by joining mating faces of each of the molding molds together at an inner face of the cavity; the mold includes a seal member that seals between the mating faces during mold fastening; when manufacturing the molded foam body, the reinforcement member is configured to be disposed across a cavity inner face of at least one of the molding molds prior to fastening the mold, and due to such placement, to be disposed inside the cavity so as to be adjacent to at least a portion of the parting line, the mold is then fastened, and the foamable synthetic resin raw material is foamed inside the cavity; the seal member is configured to be capable of sealing between the mating faces, even in a state in which the reinforcement member becomes trapped between the mating faces more to the cavity side than the seal member during mold fastening.

A mold of a second aspect is the first aspect, wherein the seal member is provided around an entire periphery of the parting line.

A mold of a third aspect is the first or second aspect, wherein a distance from the inner face of the cavity to the seal member is from 1 mm to 10 mm at at least a portion of the parting line that is disposed adjacent to the reinforcement member.

A mold of a fourth aspect is any one of the first to the third aspects, wherein: the seal member comprises an elastic material; the seal member is configured attached to one mating face of the mating faces and protruding from the one mating face to another mating face side prior to mold fastening, such that a seal is made between the mating faces by the seal member pressing against the other mating face during mold fastening; the reinforcement member comprises a non-woven fabric with a basis weight of from 0.05 kg/m$^2$ to 0.2 kg/m$^2$; and a protrusion height of the seal member from the one mating face is from 0.2 mm to 1.5 mm prior to mold fastening.

A mold of a fifth aspect is any one of the first to the fourth aspects, wherein a recessed step portion facing inside the cavity is provided at at least one of the mating faces, at at least a portion of the parting line that is disposed adjacent to the reinforcement member; the recessed step portion is configured such that the reinforcement member is able to escape inside the recessed step portion in a case in which the reinforcement member enters between the mating faces during mold fastening; and the seal member is disposed more to an opposite side from the cavity side than the recessed step portion.

A manufacturing method of a molded foam body of a sixth aspect is a manufacturing method for manufacturing a molded foam body including a molded body main body formed from a foamable synthetic resin, and a reinforcement member disposed across at least a portion of an outer face of the molded body main body and integrated with the molded body main body, using the mold of any one of the first to the fifth aspects, the manufacturing method including: a reinforcement member placement process, in which the reinforcement member is disposed across the cavity inner face of at least one of the molding molds prior to fastening the mold, and when this placement is performed, the reinforcement member is disposed so as to be adjacent to at least a portion of the parting line inside the cavity; and a foam molding process, in which the mold is fastened after the reinforcement member placement process, and the foamable synthetic resin raw material is foamed inside the cavity.

A manufacturing method for a molded foam body of a seventh aspect is the sixth aspect, wherein in the reinforcement member placement process, the reinforcement member is disposed such that an outer peripheral edge of the reinforcement member contacts the parting line, or such that a spacing between the outer peripheral edge of the reinforcement member and the parting line is 5 mm or less.

A molded foam body of a eighth aspect is a molded foam body including a molded body main body formed from a foamable synthetic resin, and a reinforcement member disposed across at least a portion of an outer face of the molded body main body and integrated with the molded body main body, wherein the molded foam body is manufactured by the manufacturing method for a molded foam body of the sixth or the seventh aspect.

A molded foam body of an ninth aspect is the eighth aspect, wherein the molded foam body is a seat pad.

Advantageous Effects of Invention

When manufacturing the molded foam body with reinforcement member using the mold of the first aspect, the reinforcement member is disposed across a cavity inner face of at least one of the molding molds prior to fastening, and the reinforcement member is disposed so as to be adjacent to at least a portion of the parting line inside the cavity when this placement is performed. The mold is then fastened, and the foamable synthetic resin raw material is foamed inside the cavity. The a seal is made between the mating faces of each of the molding molds by the seal member during mold fastening.

In the mold of the present invention, the seal member is configured so as to be capable of sealing between the mating faces, even suppose the reinforcement member becomes trapped between the mating faces more to the cavity side than the seal member during mold fastening. This enables molding defects of the molded body main body caused by the reinforcement member becoming trapped in the parting line to be reliably prevented. As a result, this enables manufacture of the molded foam body disposed with the reinforcement member up to a position on the molded body main body outer face corresponding to the parting line of the cavity inner face of the mold, without occurrence of molding defects of the molded body main body.

As in the second aspect, the seal member is preferably provided around the entire periphery of the parting line. Such a configuration enables sufficient sealing by the seal member between the mating faces around the entire periphery of the parting line.

In a seat pad employed as an general vehicle seat, for example, an acceptable range of attachment error of the reinforcement member is approximately 0 mm to 5 mm. In such cases, as in the third aspect, the distance from the inner face of the cavity to the seal member is preferably from 1 mm to 10 mm at at least the portion of the parting line that is disposed adjacent to the reinforcement member. Such a configuration enables molding defects of the molded body main body caused by the reinforcement member becoming trapped in the parting line to be more reliably prevented, even when attachment error of the reinforcement member occurs within the acceptable range.

A configuration, as in the fourth aspect, in which a seal member comprising an elastic material is used, the seal member is configured attached to one mating face of the mating faces and protruding from the one mating face to another mating face side prior to mold fastening, such that a seal is made between the mating faces by the seal member pressing against the other mating face during mold fastening, is a relatively simple and preferable configuration.

The protrusion height of the seal member from the one mating face of the molding mold prior to mold fastening (hereafter sometimes simply referred to as the protrusion height of the seal member) is suitably set according to the thickness of the reinforcement member used in the molded foam body. Note that, since it is generally difficult to unambiguously derive the thickness of the reinforcement member by actual measurement when a fabric material, such as a non-woven fabric, is used as the configuration material for the reinforcement member, it is preferable to set the protrusion height of the seal member according to the basis weight of the fabric material. Specifically, as in the fourth aspect, for example, in cases in which the reinforcement member is configured by a non-woven fabric with a basis weight of from 0.05 kg/m$^2$ to 0.2 kg/m$^2$, the protrusion height of the seal member is preferably from 0.2 mm to 1.5 mm. Such a configuration enables sufficient sealing between the mating faces by the seal member, even when the reinforcement member enters between the mating faces of each of the molding molds at the parting line during mold fastening.

In the fifth aspect, the recessed step portion facing inside the cavity is provided at the mating face of at least one of the molding molds, to at least the portion of the parting line adjacently disposed with the reinforcement member. The recessed step portion is configured such that the reinforcement member is able to escape inside the recessed step portion in a case in which the reinforcement member enters between the mating faces of the parting line during mold fastening. The seal member is disposed more to the opposite side from the cavity side than the recessed step portion. As a result, in cases in which the reinforcement member enters between the mating faces of the parting line during mold fastening, not only does the seal member seal between the mating faces of the parting line, but also at least a portion of the actual reinforcement member escapes inside the recessed step portion, such that the sealing abilities of the parting line are further enhanced, and such that molding defects of the molded body main body caused by the reinforcement member becoming trapped in the parting line can be more reliably prevented.

The manufacturing method of a molded foam body of a sixth aspect is for manufacturing a molded foam body with reinforcement member, using the mold of the present invention. As previously described, the manufacturing method of the molded foam body of the present invention accordingly enables manufacture of the molded foam body disposed with the reinforcement member up to the position on the outer face of the molded body main body corresponding to the parting line of the cavity inner face of the mold, without causing molding defects to occur on the molded body main body.

In the manufacturing method of a molded foam body of the present invention, as in the seventh aspect, the reinforcement member is preferably disposed such that the spacing between the outer peripheral edge of the reinforcement member and the parting line is 5 mm or less. Disposing the reinforcement member in this way enables manufacture of the molded foam body disposed with the reinforcement member substantially up to the position on the outer face of the molded body main body corresponding to the parting line of the cavity inner face of the mold, while more reliably not inducing the occurrence of molding defects on the molded body main body.

In the molded foam body of the eighth aspect manufactured by the manufacturing method of a molded foam body of the present invention, occurrence of molding defects caused by the reinforcement member becoming trapped in the parting line of the molded body main body is prevented, and the reinforcement member is disposed up to the position on the outer face of the molded body main body corresponding to the parting line of the cavity inner face of the mold.

As in the ninth aspect, the present invention is suitable for application to a seat pad.

DESCRIPTION OF EMBODIMENTS

Explanation follows regarding exemplary embodiments, with reference to the drawings. Note that, although the following exemplary embodiments illustrate examples of application of the present invention to a mold for manufacturing a seat pad, and to a manufacturing method of a seat pad using the mold, the present invention is also applicable to a mold for manufacturing a molded foam body other than a seat pad, and to a manufacturing method for a molded foam body using the mold.

First Exemplary Embodiment

Figure 1:
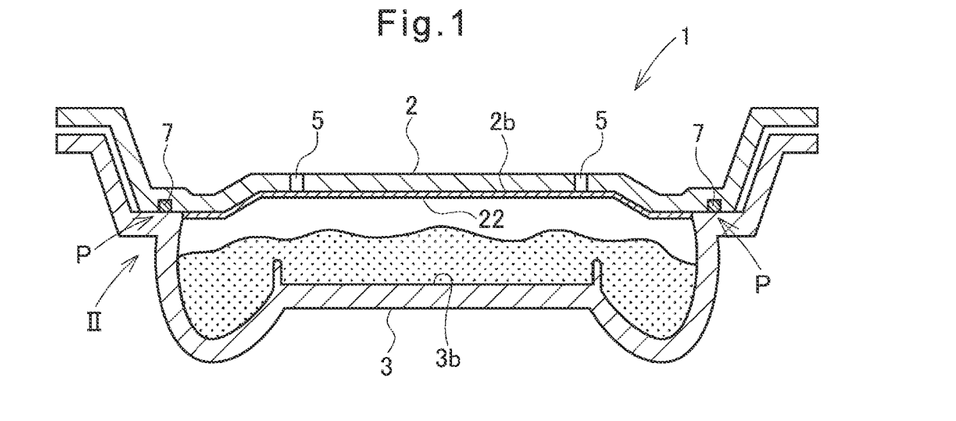
FIG. 1 is a cross-section view of a mold according to a first exemplary embodiment.
Figure 2:
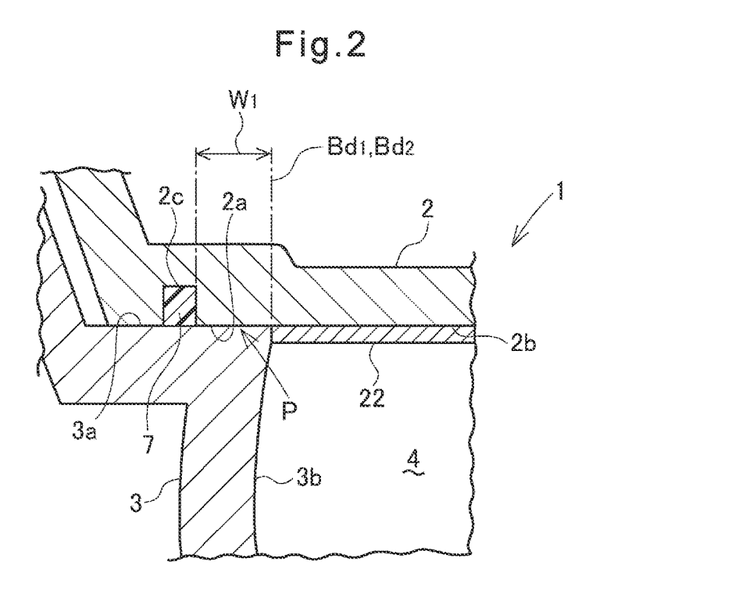
FIG. 2 is an enlarged cross-section view of portion II in FIG. 1.
Figure 3:
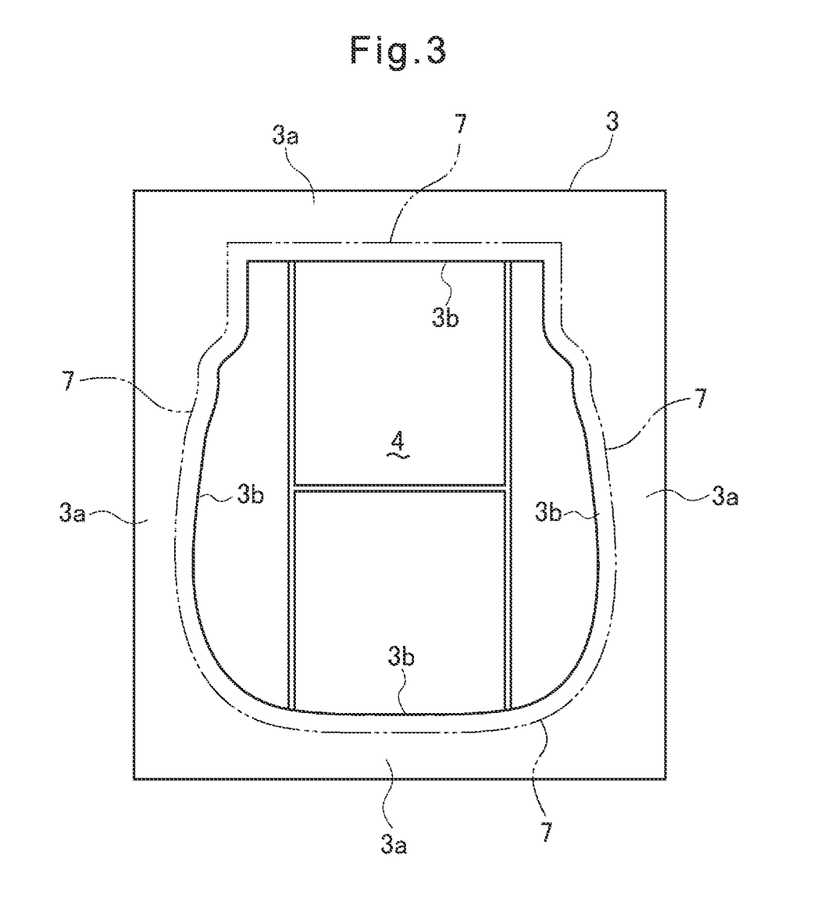
FIG. 3 is a plan view of a lower mold of the mold in FIG. 1.
Figure 4A:
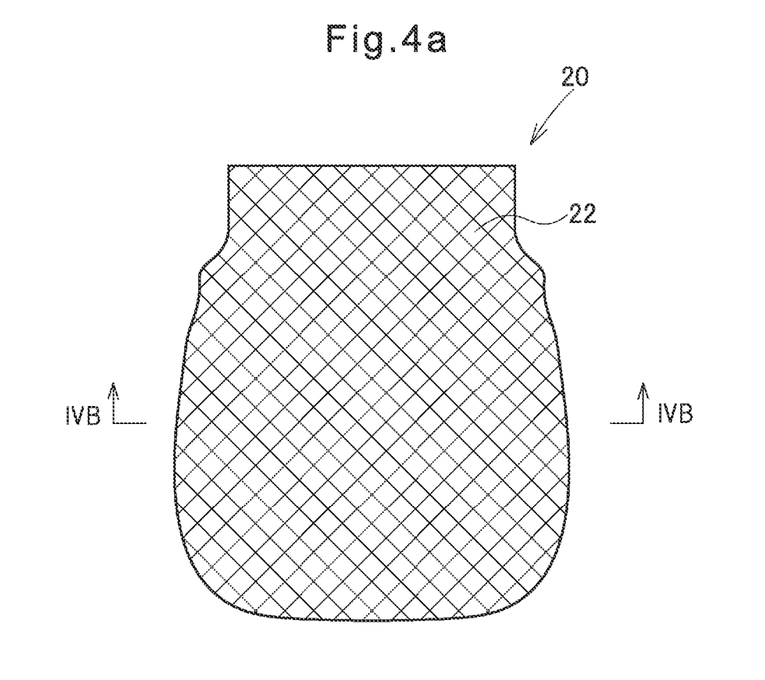
FIG. 4a is a back face view and FIG. 4b is a cross-section view of a seat pad as a molded foam body manufactured using the mold in FIG. 1.
Figure 4B:
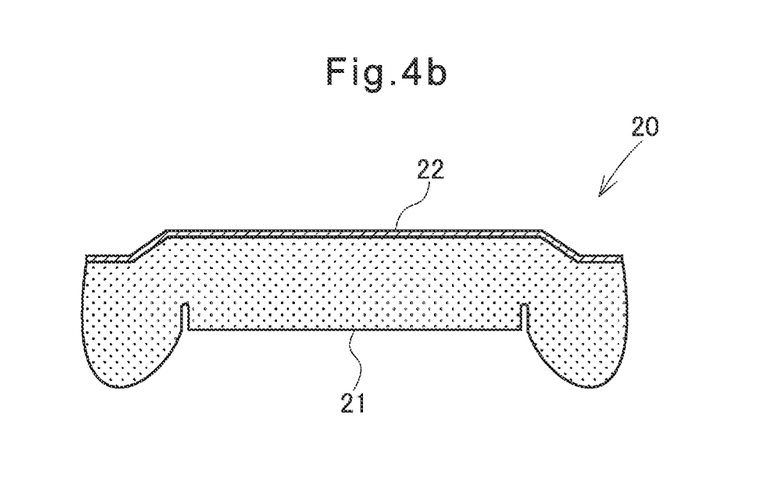
Figure 5A:
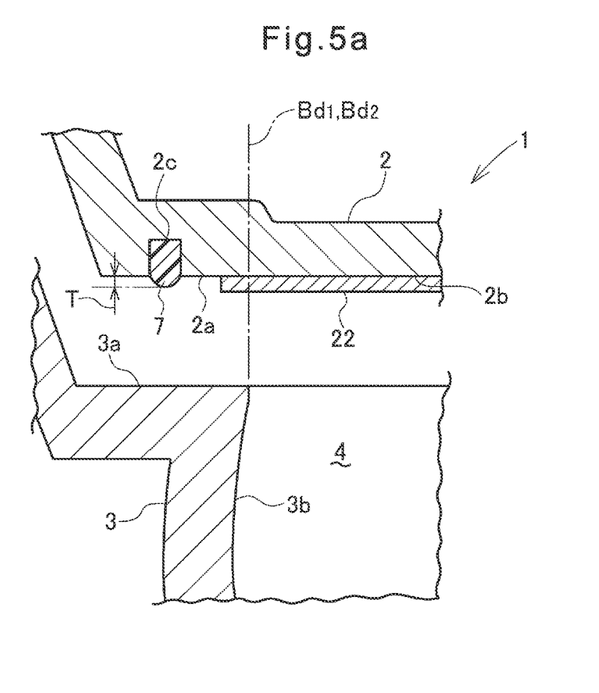
FIGS. 5a, 5b are enlarged cross-section views of the same portion as in FIG. 2 in a case in which a reinforcement member has entered a parting line of the mold in FIG. 1.
Figure 5B:
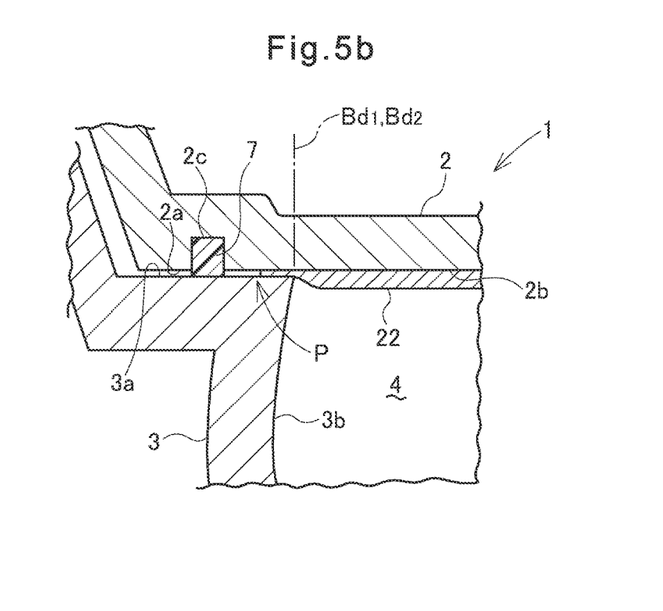

FIG. 1 is a cross-section view of a mold according to a first exemplary embodiment. FIG. 2 is an enlarged cross-section view of section II in FIG. 1. FIG. 3 is a plan view of a lower mold of the mold. FIG. 4a is a back face view of a seat pad as a molded foam body manufactured using the mold, and FIG. 4b is a cross-section view taken along line IVB-IVB in FIG. 4a. FIG. 5a and FIG. 5b are enlarged cross-section views of the same portion as illustrated in FIG. 2, in a case in which a reinforcement member has entered a parting line of the mold. FIG. 5a illustrates a state before mold fastening, and FIG. 5b illustrates a state after mold fastening.

In the present exemplary embodiment, a mold 1 serves to manufacture a seat pad 20 configuring a vehicle seat. Note that, although in the exemplary embodiment the seat pad 20 is a cushion pad configuring a seat section of a vehicle seat, the present invention is also applicable to a back pad configuring a backrest section of a vehicle seat. FIG. 1 illustrates a vertical cross-section along the left-right direction of the seat pad (cushion pad) 20 during use.

The seat pad 20 includes a seat pad main body 21 as a molded body main body comprising a foamable synthetic resin, such as polyurethane foam, and a reinforcement member 22 that is disposed across a back face of the seat pad main body 21 (the lower face of the seat pad main body 21 during use, since the seat pad 20 is a cushion pad in the exemplary embodiment) and integrated with the seat pad main body 21.

The reinforcement member 22 is disposed up to substantially the terminal end of the outer peripheral side of the back face of the seat pad main body 21. In the exemplary embodiment, as illustrated in FIGS. 4a, 4b, the reinforcement member 22 is configured in a shape covering substantially the entire back face of the seat pad main body 21, and the outer peripheral edge of the reinforcement member 22 is disposed so as to be aligned with the terminal end of the outer peripheral side of the back face of the seat pad main body 21 around the entire periphery. In the exemplary embodiment, a parting line P is present on the inner face of a cavity 4 of the mold 1, described below, at a position corresponding to the terminal end of the outer peripheral side of the back face of the seat pad main body 21. In the exemplary embodiment, the reinforcement member 22 is formed from an air permeable material. A non-woven fabric or the like is suitably applied as the air permeable material.

Note that the shape, disposition, configuration material, and the like of the reinforcement member 22 are not limited thereto. For example, the reinforcement member 22 may be configured in a shape so as to cover a portion of the back face of the seat pad main body 21, and a portion of the outer peripheral edge of the reinforcement member 22 may be disposed so as to be aligned with an portion of the outer peripheral side terminal end of the back face of the seat pad main body 21. The reinforcement member 22 may be disposed at a region of the outer face of the seat pad main body 21 other than the back face of the seat pad main body 21. The reinforcement member 22 may be disposed straddled across two or more faces out of the back face, side peripheral faces, and a seating face of the seat pad main body 21. The reinforcement member 22 may be configured of a material other than a non-woven fabric. An air permeable member may be disposed to the reinforcement member 22 at a region overlapping with exhaust holes 5 of the mold 1, described later.

In the present invention, "the reinforcement member 22 is disposed up to substantially the terminal end (=the position on the seat pad main body 21 outer face corresponding to the parting line P of the inner face of the cavity 4 of the mold 1, described later) of the outer peripheral side of the back face of the seat pad main body 21" indicates that, within a pre-set acceptable range of attachment error, the outer peripheral edge of the reinforcement member 22 may be positioned further to the center side of the back face than the outer peripheral side terminal end of the back face of the seat pad main body 21, or may protrude out from the outer peripheral side terminal end of the back face toward the sides of the seat pad main body 21.

In the exemplary embodiment, as illustrated in FIG. 1, the mold 1 includes an upper mold 2 and a lower mold 3, and exhaust holes 5 for discharging gas inside the cavity 4 surrounded by the upper mold 2 and the lower mold 3, to outside the cavity 4. Note that the mold 1 may also include a mold core (not illustrated in the drawings). In the exemplary embodiment, the upper mold 2 and the lower mold 3 are both equivalent to the molding molds of the first aspect. The upper mold 2 and the lower mold 3 mate together at respective peripheral edge portions. The symbol P indicates the parting line formed by joining together mating faces 2a, 3a (FIGS. 2, 3, 5a, 5b) of the peripheral edge portions of the upper mold 2 and the lower mold 3.

In the exemplary embodiment, the exhaust holes 5 are provided further to the center side of a cavity inner face 2b of the upper mold 2 than the parting line P. The exhaust holes 5 are disposed at portions of the cavity inner face 2b of the upper mold 2 where it is difficult to remove gas from the parting line P alone during foam molding, such as a portion at a higher position than the parting line P, or a portion where a location lower than the parting line P exists between the portion and the parting line P. FIG. 1 illustrates two exhaust holes 5 disposed at a spacing in the seat pad left-right direction; however the quantity and placement of the exhaust holes 5 are not limited thereto. Note that the exhaust holes 5 may also be disposed to the lower mold 3, or the like, if required.

The seat pad 20 (the seat pad main body 21) is molded in the cavity 4 of the mold 1 with the seating face facing downward. Namely, the seating face and side peripheral faces of the seat pad 20 are molded by a cavity inner face 3*b* of the lower mold 3, and the back face of the seat pad 20 is molded by the cavity inner face 2*b* of the upper mold 2. The parting line P is positioned at a boundary portion of the back face and the side peripheral faces of the seat pad 20, namely, at the outer peripheral side terminal end of the back face of the seat pad 20. Note that placement of the parting line P is not limited thereto, and may be disposed at a position corresponding to a location other than the outer peripheral side terminal end of the back face of the seat pad main body 21. Prior to the foam molding process of the seat pad 20, the reinforcement member 22 is disposed across the cavity inner face 2*b* of the upper mold 2, and the reinforcement member 22 is fixed to the upper mold 2 by a fixing (not illustrated in the drawings) such as pins or magnets. The outer peripheral edge of the reinforcement member 22 is disposed so as to be substantially aligned with the parting line P around the entire periphery when this placement is performed In the present invention, "the outer peripheral edge of the reinforcement member 22 is disposed so as to be substantially aligned with the parting line P around the entire periphery" indicates that, when attaching the reinforcement member 22 to the cavity inner face 2*b* of the upper mold 2, within the pre-set acceptable range of attachment error, the outer peripheral edge of the reinforcement member 22 may be positioned further to the center side of the cavity inner face 2*b* than a boundary portion $Bd_1$ between the cavity inner face 2*b* and the mating face 2*a* of the upper mold 2, or may protrude out from the boundary portion $Bd_1$ to the mating face 2*a* side (or, with the mold 1 in a fastened state, the peripheral edge portion of the reinforcement member 22 may cross the parting line P and overlap with the cavity inner face 3*b* of the lower mold 3).

As illustrated in FIG. 2 and FIG. 5*b*, when the mold 1 has been fastened, a boundary portion $Bd_2$ between the mating face 3*a* and the cavity inner face 3*b* of the lower mold 3, overlaps on the extension direction of the mating faces 2*a*, 3*a* with the boundary portion $Bd_1$ between the mating face 2*a* and the cavity inner face 2*b* of the upper mold 2. Note that the respective boundary portions $Bd_1$, $Bd_2$ may be offset in the extension direction of the mating faces 2*a*, 3*a* when the mold 1 is in a fastened state.

A seal member 7 is provided to the mold 1 in order to seal between the mating faces 2*a*, 3*a* of the upper mold 2 and the lower mold 3. The seal member 7 is configured by an elastic material such as rubber. Silicon rubber, fluorine rubber, nitrile rubber, or the like is suitable as the seal member 7; however configuration is not limited thereto.

In the exemplary embodiment, a seal member attachment groove 2*c* is provided to the mating face 2*a* of the upper mold 2, and a base end side (the upper end side in FIGS. 2, 5*a*, 5*b*) of the seal member 7 is fixed to the upper mold 2 by fitting into the seal member attachment groove 2*c*. In the exemplary embodiment, the seal member 7 is provided around the entire periphery of the mating face 2*a* of the upper mold 2. As illustrated in FIG. 5*a*, when the upper mold 2 and the lower mold 3 are in an opened state, a leading end side (the lower end side in FIG. 2, and FIGS. 5*a*, 5*b*) of the seal member 7 is in a state protruding from the mating face 2*a* of the upper mold 2 toward the lower mold 3 side. During mold fastening, the leading end side of the seal member 7 is pressed against the mating face 3*a* of the lower mold 3, and elastic close contact of the seal member 7 seals between the mating face 2*a* (the inner face of the seal member attachment groove 2*c*) of the upper mold 2 and the mating face 3*a* of the lower mold 3.

As illustrated in FIG. 5*b*, the seal member 7 is configured so as to be capable of sufficiently sealing between the mating faces 2*a*, 3*a*, even suppose the reinforcement member 22 enters the parting line P during mold fastening and becomes trapped between the mating faces 2*a*, 3*a* more to the cavity 4 side than the seal member 7. Namely, a region of the mold 1 between the mating faces 2*a*, 3*a* from the cavity 4 inner face (boundary portions $Bd_1$, $Bd_2$) to the seal member 7 forms an acceptable region for trapping the reinforcement member, that allows the reinforcement member 22 to become trapped between the mating faces 2*a*, 3*a* during mold fastening, and is capable of sufficiently sealing between the mating faces 2*a*, 3*a*, even with the reinforcement member 22 trapped in between.

A distance $W_1$ (FIG. 2) from the inner face of the cavity 4 to the seal member 7 (namely, the width of the acceptable region for trapping the reinforcement member) is suitably set corresponding to the acceptable range of attachment error of the reinforcement member 22, pre-set for the seat pad 20 manufactured using the mold 1. For example, in order to configure the seat pad 20 as a common, ordinary vehicle seat, the acceptable range of attachment error of the reinforcement member 22 is approximately from 0 mm to 5 mm. In such cases, the distance $W_1$ from the inner face of the cavity 4 to the seal member 7 is preferably from 1 mm to 10 mm, and particularly preferably from 5 mm to 10 mm.

An projection height T of the seal member 7 from the mating face 2*a* with the mold in an opened state (FIG. 5*a*; hereafter simply referred to as projection height T) is suitably set according to the thickness of the reinforcement member 22 used in the seat pad 20. Note that, since it is generally difficult to unambiguously derive the thickness of the reinforcement member 22 by actual measurement when a fabric material, such as a non-woven fabric, is used as the configuration material for the reinforcement member 22, the projection height T is preferably set according to the basis weight of the fabric material. Specifically, in cases in which the reinforcement member 22 is configured by a non-woven fabric, for example, when the basis weight of the non-woven fabric is from $0.05$ $kg/m^2$ to $0.1$ $kg/m^2$, the projection height T is preferably from 0.2 mm to 1.5 mm and particularly preferably from 0.5 mm to 0.8 mm, and when the basis weight of the non-woven fabric is from $0.1$ $kg/m^2$ to $0.2$ $kg/m^2$, the projection height T is preferably from 0.5 mm to 1.5 mm and particularly preferably from 0.8 mm to 1.2 mm.

Note that, although in the exemplary embodiment the seal member 7 is provided to the mating face 2*a* of the upper mold 2, the seal member 7 may be provided to the mating face 3*a* of the lower mold 3, or may be provided to both the mating faces 2*a*, 3*a* of the upper mold 2 and the lower mold 3, respectively.

Explanation follows regarding a procedure for manufacturing the seat pad 20 using the mold 1.

First, the upper mold 2 and the lower mold 3 are opened, the reinforcement member 22 is disposed across the cavity inner face 2*b* of the upper mold 2, and the reinforcement member 22 is fixed to the upper mold 2 by the fixing (a reinforcement placement process). In the exemplary embodiment, the reinforcement member 22 is disposed so as to cover the entire cavity inner face 2*b* of the upper mold 2, and the outer peripheral edge of the reinforcement member 22 is aligned around the entire periphery with the parting line P (the boundary portion $Bd_1$ between the cavity inner face 2b and the mating face 2a of the upper mold 2).

Next, foamable synthetic resin raw material is poured into the lower mold 3, the lower mold 3 and the upper mold 2 are fastened, and the raw material is foamed (a foam molding process). A foamed synthetic resin formed from the foamable raw material fills inside the cavity 4. When this placement is performed, gas inside the cavity 4 permeates through the reinforcement member 22 formed from an air permeable material, and is discharged from the cavity 4 through the exhaust holes 5. The seat pad main body 21 is formed, and the seat pad main body 21 and the reinforcement member 22 are integrated together by the foamable synthetic resin filling inside the cavity 4. After the foamed synthetic resin has cured, the mold is opened and removed. The seat pad 20 is then completed by surface finishing treatment of the seat pad 20, if required.

In the mold 1, the seal member 7 seals between the mating faces 2a, 3a during mold fastening. Suppose the reinforcement member 22 becomes trapped between the mating faces 2a, 3a more to the cavity 4 side than the seal member 7 during mold fastening, configuration is such that the seal member 7 is able to seal between the mating faces 2a, 3a. This enables molding defects of the seat pad main body 21 caused by the reinforcement member becoming trapped in the parting line P to be reliably prevented. This accordingly enables manufacture of the seat pad 20 disposed with the reinforcement member 22 up to a position on the seat pad main body 21 outer face corresponding to the parting line P of the cavity 4 inner face of the mold 1, without occurrence of molding defects of the seat pad main body 21.

In the exemplary embodiment, the seal member 7 is provided around the entire periphery of the parting line P, thereby enabling sufficient sealing between the mating faces 2a, 3a by the seal member 7 around the entire periphery of the parting line P during mold fastening.

As previously described, since the acceptable range of attachment error of the reinforcement member 22 is approximately from 0 mm to 5 mm for a seat pad 20 used in an ordinary vehicle seat, by setting the distance $W_1$ from the inner face of the cavity 4 to the seal member 7 from 1 mm to 10 mm, and preferably from 5 mm to 10 mm, as in the exemplary embodiment, molding defects of the seat pad main body 21 caused by the reinforcement member 22 becoming trapped in the parting line P can be more reliably prevented, even when there is attachment error of the reinforcement member 22 within the acceptable range.

In the exemplary embodiment, the reinforcement member 22 is configured from a non-woven fabric, and the projection height T of the seal member 7 from the mating face 2a with the mold is an opened state is suitably set according to the basis weight of the non-woven fabric. Namely, when the basis weight of the non-woven fabric is from 0.05 kg/m² to 0.1 kg/m², the projection height T is preferably from 0.2 mm to 0.8 mm, and when the basis weight of the non-woven fabric is from 0.1 kg/m² to 0.2 kg/m², the projection height T is preferably from 0.8 mm to 1.5 mm. With such a configuration, the seal member 7 is firmly pressed against the mating face 3a of the lower mold 3 even when the reinforcement member 22 enters between the mating faces 2a, 3a, enabling sufficient sealing between the mating faces 2a, 3a by the seal member 7.

Second Exemplary Embodiment

Figure 6A:
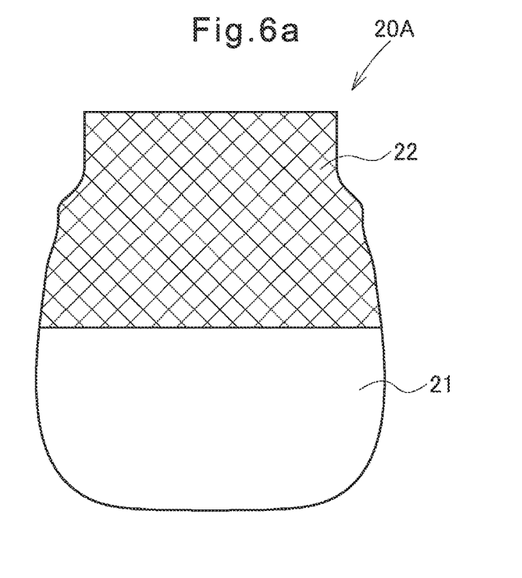
FIG. 6a is a back face view and FIG. 6b is a plan view of a lower mold illustrated in a second exemplary embodiment.
Figure 6B:
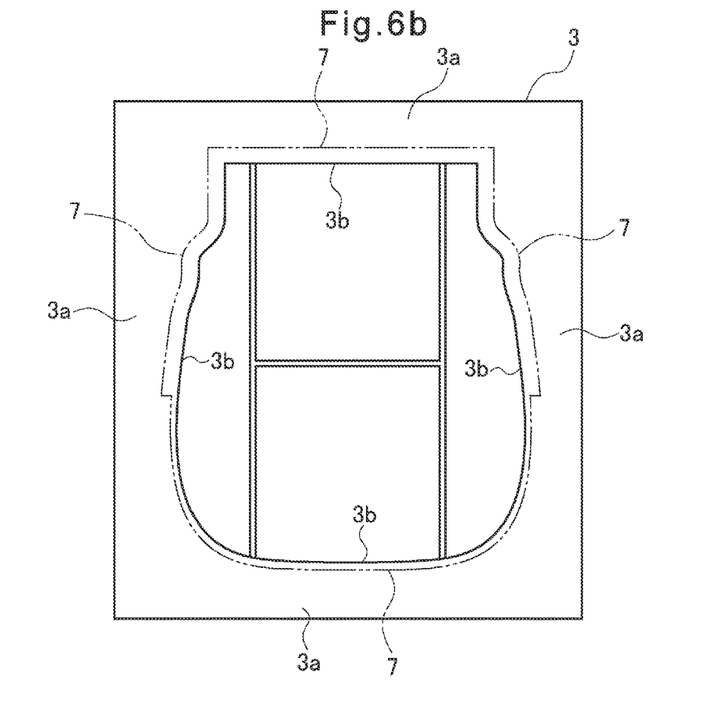

FIG. 6a is a back face view of a seat pad manufactured using a mold according to a second exemplary embodiment, and FIG. 6b is a plan view of a lower mold of the mold.

In the seat pad 20 of the first exemplary embodiment described above, the reinforcement member 22 is configured so as to cover substantially the entire back face of the seat pad main body 21, and when the reinforcement member 22 has been disposed across the cavity inner face 2b of the upper mold 2, the outer peripheral edge of the reinforcement member 22 is adjacent to the parting line P of the mold 1 around the entire periphery of the parting line P. As a result, in the first exemplary embodiment, the seal member 7 is separated from the inner face of the cavity 4 around the entire periphery of the parting line P by the distance $W_1$, and the acceptable region for trapping the reinforcement member is formed therebetween. However, in the present embodiment, the reinforcement member 22 may also be configured so as to cover only a portion of the back face of a seat pad main body 21. In such a case, the acceptable region for trapping the reinforcement member between the seal member 7 and the inner face of the cavity 4 may be formed only to portions of the parting line P adjacent to the outer peripheral edge of the reinforcement member 22.

For example, in a seat pad 20A of the second exemplary embodiment, as illustrated in FIG. 6a, the shape of a reinforcement member 22 is configured so as to cover only a front-rear direction rear half side (hereafter simply referred to as the rear half side) of a back face of a seat pad main body 21 during use of the seat pad 20A, and the reinforcement member 22 is disposed up to the outer peripheral edge of the rear half side of the back face of the seat pad main body 21. As a result, when the reinforcement member 22 is disposed across a cavity inner face 2b of an upper mold 2 (not illustrated in FIG. 6b), the outer peripheral edge of the reinforcement member 22 is only adjacent to substantially the half-peripheral portion of the parting line P corresponding to the outer peripheral edge of the back face rear half side of the seat pad main body 21. Accordingly, in the exemplary embodiment, as illustrated in FIG. 6b, it is sufficient to separate the seal member 7 from the inner face of the cavity 4 by the distance $W_1$ to the parting line P only at substantially the half-peripheral portion rear half side, adjacent to the outer peripheral edge of the reinforcement member 22, and to form the acceptable region for trapping the reinforcement member therebetween.

It is preferable to make the distance from the cavity 4 to the seal member 7 as small as possible at the remaining portion of the parting line P that is not adjacent to the outer peripheral edge of the reinforcement member 22. This thereby prevents unnecessary burring of the seat pad main body 21, or the like, from occurring.

Note that although, as illustrated in FIG. 6b, the seal member 7 is provided to the mating face 2a of the upper mold 2 in the present exemplary embodiment, the seal member 7 may be provided to the mating face 3a of the lower mold 3, or provided to both the mating faces 2a, 3a of the upper mold 2 and the lower mold 3, respectively.

Other configuration of the second exemplary embodiment is similar to the first exemplary embodiment.

Third Exemplary Embodiment

Figure 7A:
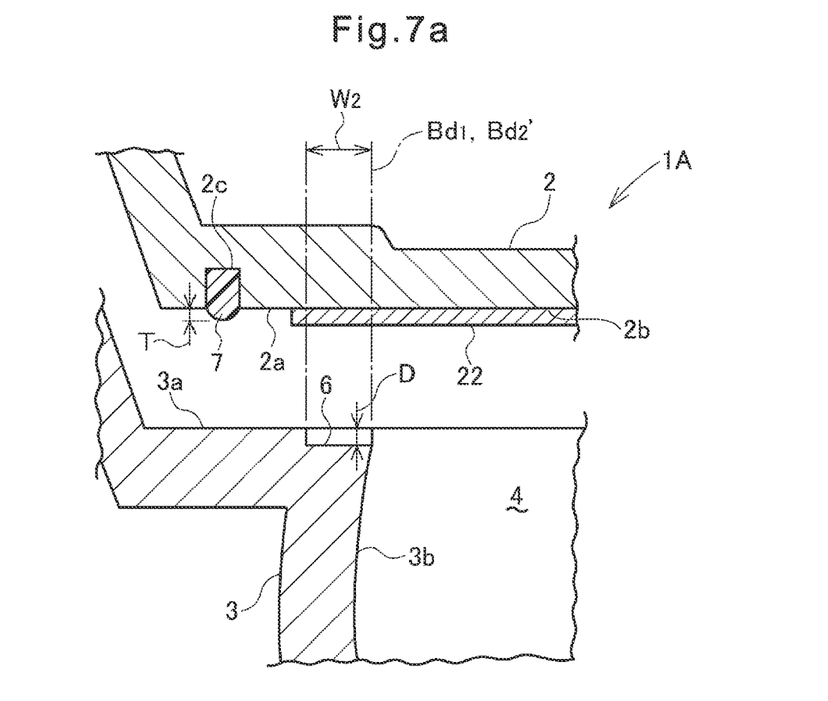
FIGS. 7a, 7b are enlarged cross-section views of the same portion as in FIG. 2 of a mold according to a third exemplary embodiment.
Figure 7B:
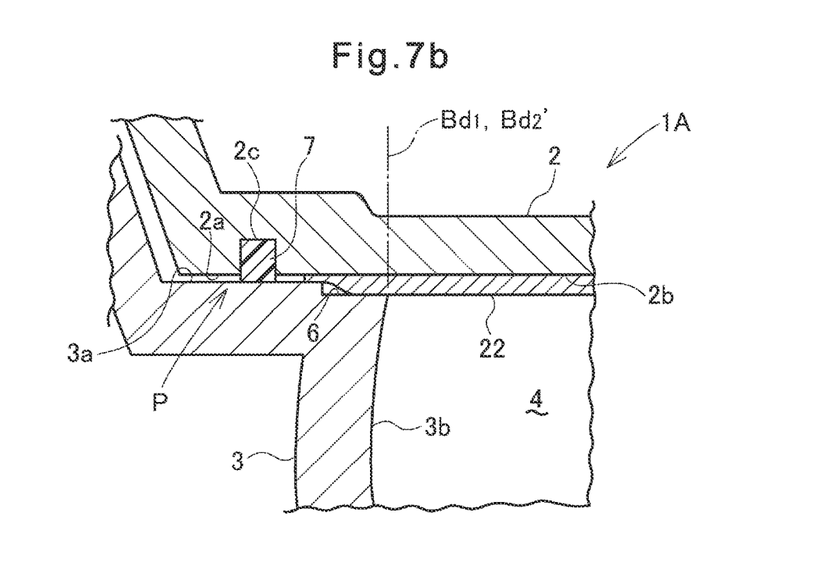
Figure 8:
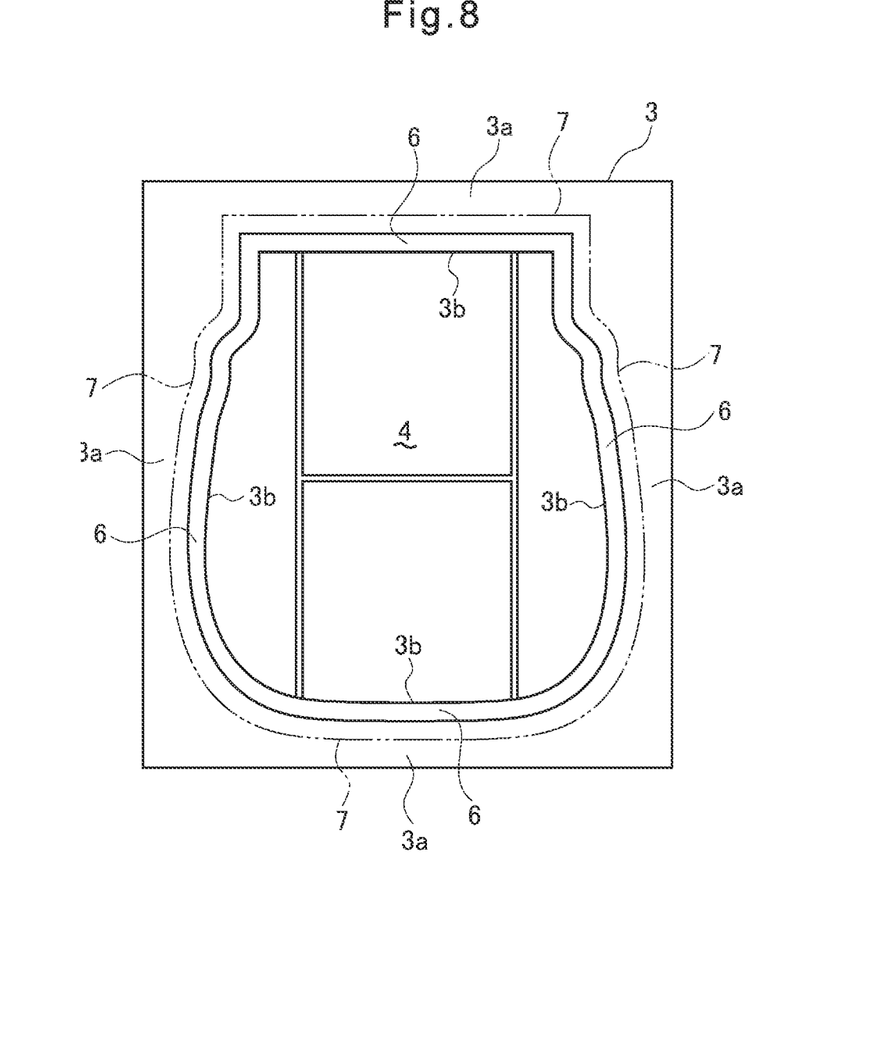
FIG. 8 is a plan view of a lower mold of the mold in FIGS. 7a, 7b.

FIGS. 7a, 7b are enlarged cross-section views of the vicinity of a parting line of a mold according to a third exemplary embodiment (a similar portion to that illustrated in FIG. 2). FIG. 7a illustrates a state before mold fastening, and FIG. 7b illustrates a state after mold fastening. Note that FIGS. 7a, 7b illustrate a case in which a reinforcement member has entered the parting line of the mold. FIG. 8 is a plan view of a lower mold of the mold.

In a mold 1A of the exemplary embodiment, a recessed step portion 6 facing inside the cavity 4 is provided to the mating face 3a of the lower mold 3, and a seal member 7 is provided at an opposite side from the cavity 4 than the recessed step portion 6. The recessed step portion 6 is configured such that the reinforcement member 22 can escape inside the recessed step portion 6 in cases in which the reinforcement member 22 enters the parting line P (between the respective mating faces 2a, 3a). Similarly to the first exemplary embodiment, in the present exemplary embodiment, the outer peripheral edge of the reinforcement member 22 is disposed so as to be as adjacent to the parting line P around the entire periphery of the parting line P. As a result, the recessed step portion 6 is also formed around the entire periphery of the mating face 3a, as illustrated in FIG. 8.

As illustrated in FIG. 7b, when the mold 1A has been fastened, a boundary portion $Bd_2'$ between a bottom face of the recessed step portion 6 and the cavity inner face 3b of the lower mold 3, overlaps on the extension direction of the mating faces 2a, 3a with the previously described boundary portion $Bd_1$ between the mating face 2a and the cavity inner face 2b of the upper mold 2. Note that the respective boundary portions $Bd_1$, $Bd_2'$ may be offset in the extension direction of the mating faces 2a, 3a when the mold 1A is in a fastened state.

Similarly to the distance $W_1$ from the inner face of the cavity 4 to the seal member 7, a width $W_2$ of the recessed step portion 6 from a boundary portion $Bd_2'$ in the mating faces 2a, 3a extension direction and the direction towards and away from the cavity 4 (FIG. 7a; hereafter simply referred to as width $W_2$), is suitably set corresponding to the acceptable range of attachment error of the reinforcement member 22, pre-set for a seat pad 20 manufactured using the mold 1A. For example, in order to configure the seat pad 20 as a common ordinary vehicle seat, the acceptable range of attachment error of the reinforcement member 22 is approximately from 0 mm to 5 mm. In such cases, the width $W_2$ of the recessed step portion 6 is preferably from 1 mm to 10 mm, and particularly preferably from 3 mm to 5 mm.

Similarly to the projection height T of the seal member 7, a depth D from the mating face 3a to the bottom face of the recessed step portion 6 (FIG. 7a; hereafter simply referred to as depth D), is suitably set according to the thickness of the reinforcement member 22 used for the seat pad 20. It is preferable to set the depth D of the recessed step portion 6 according to the fabric basis weight in cases in which a fabric material, such as a non-woven fabric, is used as the configuration material of the reinforcement member 22. Specifically, in cases in which the reinforcement member 22 is configured by a non-woven fabric, for example, when the basis weight of the non-woven fabric is from 0.05 kg/m² to 0.1 kg/m², the depth D is preferably from 0.2 mm to 0.5 mm and particularly preferably from 0.3 mm to 0.4 mm, and when the basis weight of the non-woven fabric is from 0.1 kg/m² to 0.2 kg/m², the depth D is preferably from 0.3 mm to 0.6 mm and particularly preferably from 0.4 mm to 0.5 mm.

Note that the seal member 7 may be disposed with a spacing toward the cavity 4 outside from the recessed step portion 6, or may be disposed adjacent to the recessed step portion 6. The spacing between the seal member 7 and the recessed step portion 6 is preferably from 1 mm to 10 mm, and particularly preferably from 3 mm to 5 mm.

Other configuration of the mold 1A is similar to the mold 1 of the first exemplary embodiment, and in FIGS. 7a, 7b, 8, the same reference numerals as FIGS. 1 to 5b indicate the same portions. Moreover, the method of manufacturing the seat pad 20 using the mold 1A is similar to when the mold 1 is used.

The mold 1A also exhibits similar advantageous effects to the mold 1 of the first exemplary embodiment.

A recessed step portion 6 facing inside the cavity 4 is provided to the mating face 3a of the lower mold 3 of the mold 1A. The recessed step portion 6 is configured such that the reinforcement member 22 can escape inside the recessed step portion 6 in cases in which the reinforcement member 22 enters the parting line P between the respective mating faces 2a, 3a during mold fastening. The seal member 7 is disposed at the opposite side from the cavity 4 than the recessed step portion 6. As a result, in cases in which the reinforcement member 22 enters between the respective mating faces 2a, 3a when the mold is fastened, not only does the seal member 7 seal between the respective mating faces 2a, 3a, but also at least a portion of the actual reinforcement member 22 escapes inside the recessed step portion 6, such that the sealing abilities of the parting line P are enhanced, and such that molding defects of the seat pad main body 21 caused by the reinforcement member 22 becoming trapped in the parting line P can be more reliably prevented.

Note that, although the recessed step portion 6 is provided to the mating face 3a of lower mold 3 in the present exemplary embodiment, the recessed step portion 6 may be provided to the mating face 2a of the upper mold 2, or provided to both the mating faces 2a, 3a of the upper mold 2 and the lower mold 3, respectively.

Fourth Exemplary Embodiment

Figure 9:
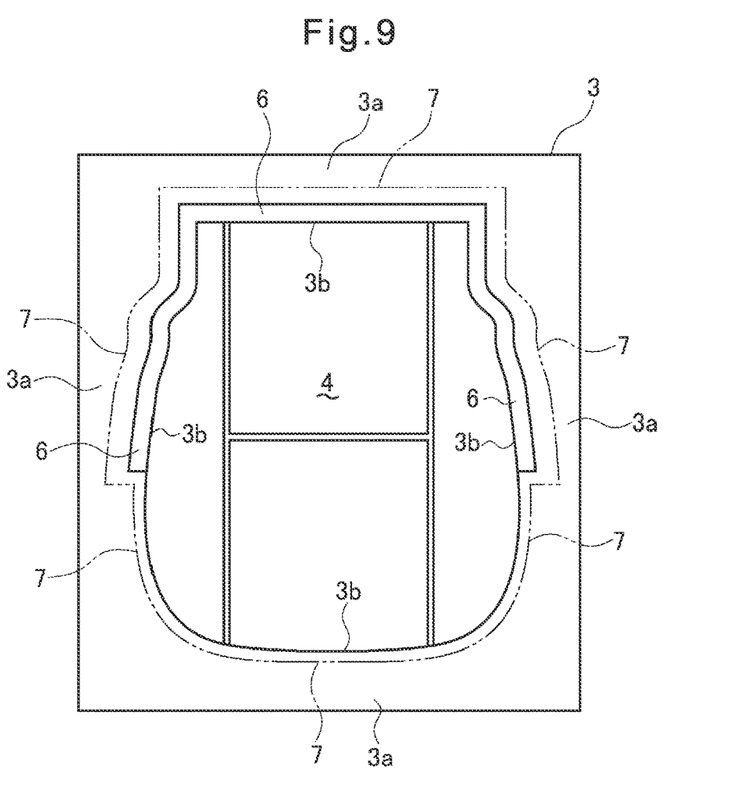
FIG. 9 is a rear face view of a seat pad and a plan view of a lower mold illustrating a fourth exemplary embodiment.

FIG. 9 is a plan view of a lower mold of a mold according to a fourth exemplary embodiment.

As in the second exemplary embodiment previously described, in cases in which a reinforcement member 22 is only adjacent to a portion of a parting line P, it is sufficient to only provide a recessed step portion 6 to the portion of the parting line P to which the reinforcement member 22 is adjacent.

It is preferable not to provide the recessed step portion 6 to the remaining portion of the parting line P that is not adjacent to the outer peripheral edge of the reinforcement member 22. This prevents unnecessary burring of the seat pad main body 21, or the like, from occurring.

Other configuration of the fourth exemplary embodiment is similar to that of the second and the third exemplary embodiment.

Each of the exemplary embodiments described above is merely an example of the present invention, and the present invention may be configured differently to the configurations illustrated.

For example, in each of the exemplary embodiments described above, an example is given of the present invention applied to a seat pad; however the present invention is also applicable to a molded foam body other than a seat pad.

The present invention is not limited to the mating faces of an upper mold and a lower mold, and may be applied to all mating locations of a mold, such as between an upper mold and a mold core, or a lower mold and a mold core.

The present invention is explained in detail herein using specific embodiments; however it is obvious to a person skilled in the art than various modifications are possible without departing from the spirit and scope of the invention.

Note that the present application is based on Japanese Patent Application (Patent Application No. 2012-028461) filed on Feb. 13, 2012, the entirety of which is incorporated by reference herein.

The invention claimed is:

1. A manufacturing method for manufacturing a molded foam body including a molded body main body formed from a foamable synthetic resin, and a non-woven fabric reinforcement member disposed across at least a portion of an outer face of the molded body main body and integrated with the molded body main body, the manufacturing method comprising:

providing a mold including at least two molding molds, the at least two molding molds being shaped so as to be capable of forming a cavity surrounded by the molding molds by fastening the molding molds together and forming a parting line by joining mating faces of each of the molding molds together at an inner face of the cavity;

a non-woven fabric reinforcement member placement process, in which the non-woven fabric reinforcement member is disposed across a cavity inner face of at least one molding mold prior to fastening the mold, and due to such disposition, the non-woven fabric reinforcement member is disposed so as to be adjacent to at least a portion of the parting line inside the cavity;

fixing a seal member to one mating face of the mating faces so that the seal member protrudes from the one mating face to another mating face side, so that a seal is made between the mating faces by the seal member pressing against the other mating face during mold fastening;

forming a region of the mold between the mating faces from the cavity inner face to the seal member to form a region for trapping the non-woven fabric reinforcement member;

forming a recessed step portion facing inside the cavity on the mating face of the molding mold that is opposite to the molding mold at which the reinforcement member is disposed, wherein the recessed step portion is formed corresponding to a size of the non-woven fabric reinforcement member, and is shaped such that the non-woven fabric reinforcement member is able to escape inside the recessed step portion in a case in which the non-woven fabric reinforcement member enters between the mating faces during mold fastening;

forming the cavity surrounded by the molding molds by fastening the molding molds together, and forming the parting line by joining mating faces of each of the molding molds together at an inner face of the cavity; and a foam molding process, in which after the non-woven fabric reinforcement member placement process, the foamable synthetic resin is foamed inside the cavity, wherein the seal member is disposed more to an opposite side from a cavity side than the recessed step portion, and wherein a basis weight of the non-woven fabric is from 0.05 kg/m² to 0.1 kg/m² and a projection height T of the seal member from the one mating face is from 0.2 mm to 0.8 mm, or the basis weight of the non-woven fabric is from 0.1 kg/m² to 0.2 kg/m² and the projection height T is from 0.8 mm to 1.5 mm prior to mold fastening.

2. The manufacturing method for a molded foam body of claim 1, wherein:

in the non-woven fabric reinforcement member placement process, the non-woven fabric reinforcement member is disposed such that an outer peripheral edge of the non-woven fabric reinforcement member contacts the parting line, or such that a spacing between the outer peripheral edge of the reinforcement member and the parting line is 5 mm or less.

3. A molded foam body including a molded body main body formed from a foamable synthetic resin, and a reinforcement member disposed across at least a portion of an outer face of the molded body main body and integrated with the molded body main body, wherein:

the molded foam body is manufactured by the manufacturing method for a molded foam body of claim 1.

4. The molded foam body of claim 3, wherein the molded foam body is a seat pad.

5. A mold for manufacturing a molded foam body including a molded body main body comprising a foamable synthetic resin, and a reinforcement member disposed across at least a portion of an outer face of the molded body main body and integrated with the molded body main body, wherein:

the mold includes at least two molding molds, a cavity surrounded by the molding molds is formed by fastening the molding molds together, and a parting line is formed by joining mating faces of each of the molding molds together at an inner face of the cavity;

the mold includes a seal member that is fixed to one of the molding molds and seals between the mating faces during mold fastening;

when manufacturing the molded foam body, the reinforcement member that comprises a non-woven fabric is disposed across a cavity inner face of the molding mold to which the seal member is fixed prior to fastening the mold, and due to such placement, to be disposed inside the cavity so as to be adjacent to at least a portion of the parting line;

a region of the mold between the mating faces from the cavity inner face to the seal member forms a region for trapping the reinforcement member;

the seal member is attached to one mating face of the mating faces and protrudes from the one mating face to another mating face side prior to mold fastening, such that a seal is made between the mating faces by the seal member pressing against the other mating face during mold fastening;

wherein a basis weight of the non-woven fabric is from 0.05 kg/m² to 0.1 kg/m², and a projection height T of the seal member from the one mating face is from 0.2 mm to 0.8 mm, or the basis weight of the non-woven fabric is from 0.1 kg/m² to 0.2 kg/m², and the projection height T is from 0.8 mm to 1.5 mm prior to mold fastening;

a recessed step portion facing inside the cavity is provided on the mating face of the molding mold that is opposite to the molding mold at which the reinforcement member is disposed, where at least a portion of the parting line is disposed adjacent to the reinforcement member;

the recessed step portion is formed corresponding to a size of the reinforcement member, and is configured such that the reinforcement member is able to escape inside the recessed step portion in a case in which the reinforcement member enters between the mating faces during mold fastening; and the seal member is disposed more to an opposite side from a cavity side than the recessed step portion.

6. The mold of claim 5, wherein the recessed step portion is opened toward inside the cavity.

7. The mold of claim 5, wherein the seal member is provided around an entire periphery of the parting line.

8. The mold of claim 5, wherein a distance from the inner face of the cavity to the seal member is from 1 mm to 10 mm where at least a portion of the parting line is disposed adjacent to the reinforcement member.

9. The mold of claim 5, wherein the seal member comprises an elastic material.

10. The mold of claim 5, wherein an outer peripheral edge of the reinforcement member is disposed so as to be aligned with the parting line around an entire periphery.

11. The mold of claim 5, wherein the recessed step portion is arranged to be in parallel with and along the parting line.

12. The mold of claim 5, wherein the basis weight of the non-woven fabric is from 0.05 kg/m$^2$ to 0.1 kg/m$^2$, and a depth of the recessed step portion is from 0.3 mm to 0.4 mm, or the basis weight of the non-woven fabric is from 0.1 kg/m$^2$ to 0.2 kg/m$^2$, and the depth is from 0.4 mm to 0.6 mm.

* * * * *